(12) United States Patent
Gupte et al.

(10) Patent No.: US 10,346,443 B2
(45) Date of Patent: Jul. 9, 2019

(54) MANAGING SERVICES INSTANCES

(71) Applicant: EntIT Software LLC, Sunnyvale, CA (US)

(72) Inventors: Prashant Gupte, Sunnyvale, CA (US); Stephane Herman Maes, Fremont, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 172 days.

(21) Appl. No.: 15/590,148

(22) Filed: May 9, 2017

(65) Prior Publication Data

US 2018/0329981 A1 Nov. 15, 2018

(51) Int. Cl.
| | |
|---|---|
| H04L 29/08 | (2006.01) |
| G06F 16/28 | (2019.01) |
| G06N 5/04 | (2006.01) |
| H04L 12/24 | (2006.01) |
| G06F 8/60 | (2018.01) |
| G06F 9/445 | (2018.01) |
| G06F 16/903 | (2019.01) |

(52) U.S. Cl.
CPC ............. G06F 16/288 (2019.01); G06F 8/60 (2013.01); G06F 9/44521 (2013.01); G06F 16/90335 (2019.01); G06N 5/043 (2013.01); H04L 41/0893 (2013.01); H04L 41/145 (2013.01); H04L 67/16 (2013.01); *G06N 5/04* (2013.01); *H04L 41/12* (2013.01)

(58) Field of Classification Search
CPC .................................................. H04L 41/0893
See application file for complete search history.

(56) References Cited

U.S. PATENT DOCUMENTS

| | | | | |
|---|---|---|---|---|
| 2014/0282525 | A1* | 9/2014 | Sapuram | G06Q 30/0631 718/1 |
| 2015/0326579 | A1* | 11/2015 | Chandwani | H04L 63/0281 709/225 |
| 2016/0048408 | A1 | 2/2016 | Madhu et al. | |

FOREIGN PATENT DOCUMENTS

WO    WO-2016053306    4/2016

OTHER PUBLICATIONS

DMTF, "Cloud Infrastructure Management Interface (CIMI)", Distributed Management Task Force Technical Note, (Web Page), Oct. 2012, 3 pages.
Hewlett Packard Enterprise, Data sheet, HPE Universal CMDB and UCMDB Configuration Manager, 2016 (4 pages).
Hewlett Packard Enterprise, Data sheet, HPE Universal Discovery software, 2016 (8 pages).
Hewlett Packard Enterprise, HPE Enterprise Maps, Product presentation, 2015 (34 pages).
O'Reilly, J., "The Hybrid Cloud Management Platform and the Modern Enterprise", Tech Target, Buying Decisions, (Web Page), Dec. 2016, 5 pages.

(Continued)

*Primary Examiner* — Adnan M Mirza (57) ABSTRACT

In some examples, information of a service instance provisioned or modified by a first system distinct from a management system is received, where the provisioning or modification of the service instance by the first system is initially unknown to the management system. As part of a binding phase, a model of the service instance is inferred. The management system manages a lifecycle of the service instance using the model and the policy.

21 Claims, 4 Drawing Sheets

(56) References Cited

OTHER PUBLICATIONS

VMware, Inc., Product Datasheet—VMware vCenter Server, Centrally Managed Virtual Infrastructure Delivered with Confidence, 2015 (2 pages).
Wikipedia, HP Cloud Service Automation Software last modified Nov. 4, 2015 (6 pages).
Wikipedia, UCMDB last modified Feb. 21, 2017 (6 pages).

\* cited by examiner

MANAGING SERVICES INSTANCES

BACKGROUND

Entities (such as business entities, educational organizations, government agencies, individuals, etc.) can use cloud computing and the services provided through a cloud computing system to, for example, offer goods or services, maintain business records, and provide individuals with access to computing resources, and so forth. Cloud computing provides consumers of a cloud with scalable and pooled computing, storage, and networking capacity as a service or combinations of services.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cloud may be designed, provisioned, deployed, and managed by or for an entity for which the cloud was created. As used here, a "cloud" can refer to a collection of resources, such as processing resources (e.g., server computers, processors, etc.), storage resources (e.g., implemented with disk drives, solid state memories, etc.), network resources (e.g., routers, switches, gateways, etc.), programs (e.g., applications, operating systems, firmware, or other machine-executable instructions), virtual resources (such as virtual machines or virtual networks), or other types of resources.

A cloud can be designed, provisioned, deployed, and managed by a cloud service manager (also referred to as a "cloud controller"). An example of a cloud controller is a Cloud Service Automation (CSA) controller from Hewlett-Packard Enterprise (HPE). Although reference is made to the CSA controller as an example of a cloud controller, it is noted that other different cloud controllers (systems that provision instances based on a model then can track or manage these instances) can be employed in other implementations.

A cloud can provide (or support provisioning of) services to consumers of the cloud. Services (including, e.g., applications, middleware, operating systems, resources, etc.) can be ordered by customers of the cloud, and the services are provided by the cloud can integrate seamlessly with other products or services in a customer's enterprise, where the services can include solving information technology (IT) infrastructure issues, providing content to provision servers, virtual machines, or other components, and so forth.

A cloud controller can deliver services to consumers while utilizing (explicitly or implicitly) a model of a service (contained in code) that is known to the cloud controller. In some examples, the model of a service is known to the cloud controller if the cloud controller participated in provisioning the service. Provisioning a service can refer to creating and/or instantiating the service in a system, such as a cloud, for access or use. Creating a service can refer to determining a design of the service, while instantiating the service can refer to creating an instance of the service ("service instance") that can be executed or operated.

A model of a service (also referred to as a "service model") can include any or some combination of the following: a topology of a service, such as a topology that describes an arrangement of resources (e.g., stack of resources) used by an instance of a service and/or a topology of tasks of the service; a workflow of tasks (e.g., a sequence of tasks); code (machine-readable instructions such as Python logic) that implement the service; and so forth. More generally, a model of a service can include components of the service ("service components"), where such service components can include resources, tasks of a workflow, portions of code, and so forth.

A topology of a service can refer to a representation of an arrangement (e.g., an architecture) of service components (e.g., resources, tasks) of the service, where the representation can indicate how the service components are related to one another architecturally, operationally, and so forth. For example, a topology can be represented as a tree (or other graph) of nodes, where each node can represent a respective service component, and links between the nodes can represent relationships between the service components. Alternatively, a topology can refer to a representation of how tasks of the service are related to one another. In further examples, a topology can refer to a representation of the combination of the foregoing. The topology may also associate, with a service instance, a model used to instantiate the service instance (at least the non-brown service instances—see below for an explanation of what constitutes brown service instances and how they are handled).

In some examples, as part of so-called "day-1" operations, a cloud controller can provision services automatically (e.g., in answer to a call such as a call to an Application Programming Interface or API) or at the request of consumers (as part of self-service of the consumers) of a cloud. A consumer (a user or organization) of a cloud can also be referred to as a tenant of the cloud. Services created by the cloud controller as part of day-1 operations are known to the cloud controller (e.g., the cloud controller knows the model with associated lifecycle management APIs, etc., how services were instantiated—i.e., what are the instance elements that have been created and how the instance elements are associated to that model). In this manner, the cloud controller is able to perform so-called "day-2" operations with respect to such realizations or instances of these services.

Although referred to as day-2 operations, such operations cover the life span of a service from creation time of the service instance to the end of life of the service instance.

During the life span, lifecycle management actions can be performed on the service instance, such as starting or stopping the service instance, upgrading the service instance (such as by applying a program patch), monitoring (for performances, usage, security, compliance, etc.) and managing the service instance (e.g. based on policies or other external monitoring or remediation setup. Remediation can include the cloud controller implementing (or being asked to perform) remediation actions. In other examples, other mechanisms can be considered, such as for service instances that are modified during day-2 operations (examples of brown service instances discussed further below), where the mechanisms can ensure compliance of such modified service instances with a service level agreement (SLA), and/or other actions.

In some cases, there may be service instances created or modified by other system(s) that is (are) distinct from the cloud controller. For example, a virtual machine may be created by a system like VMWare vSphere instead of the cloud controller (e.g., HPE CSA). The cloud controller may not be aware of services created by system(s) distinct from the cloud controller, and thus would not be aware of the model of the services, and thus would be unable to perform lifecycle management actions with respect to such services.

More generally, along with the services that are to be managed by a cloud controller, there may have already other instances that have been deployed prior to use of the cloud controller in a given setting. Such services may have been created and instantiated by other systems, and/or may have been manually created and instantiated by humans (e.g., using scripts). These services are part of an existing service environment (including a service instance or multiple service instances) that are to be somehow imported for management by the cloud controller. Stated differently, for a cloud controller to perform day-2 operations on services created or instantiated by other systems, the cloud controller would have to somehow be made aware of such services (e.g., what these service instances are and how to manage them and who can see them or manage them). Importing and managing an existing service environment in a cloud is a challenge that many organizations are facing. Existing service environments can include a simple service instance that employs just a single server, or alternatively can include more complex service instances that employ multi-tier application systems that include application servers, storage systems, database servers, firewalls, load balancers, and so forth.

In accordance with some implementations of the present disclosure, techniques or systems are able to automatically import an existing service instance (e.g., provisioned by another system or user different from a cloud controller) into the cloud controller and then enable management capabilities for the imported service instances. An existing service instance is deployed as part of a so-called "day-minus-1" operation, which occurred prior to day-1 operations of the cloud controller. Information of an existing service instance provided can be provided to the cloud controller to allow the cloud controller to perform day-2 operations on the service instance.

In other cases, even though a services instance may be known to the cloud controller (e.g., because the cloud controller created and instantiated the service instance), a different system or a human user may perform modification of the service instance. For example, a virtual machine system may move a virtual machine from a first physical machine to a second physical machine (e.g., based on placement optimization policies using an optimization engine), and the cloud controller is not involved in this virtual machine movement and thus would be unaware of the modification of the environment that includes the virtual machine. As another example, a Platform as a Service (PaaS) system (e.g., Cloud Foundry or OpenShift) or container management system (e.g., Mesos, Docker Swarm, or Kubernetes) can perform auto-management of a container instance (an instance of a container in which tasks can be executed and isolated from other tasks in another container instance), where the container management can include moving the container instance or scaling the container instance up or down (to increase or decrease the size of the container instance).

Such modifications can cause the initial service model to no longer reflect the actual deployed service instance (as modified). In accordance with further implementations of the present disclosure, techniques or systems are able to automatically import modifications of a service instance (which may have a configuration that was previously known to a cloud controller) into the cloud controller and then enable management capabilities for the modified service instance.

In further cases, a cloud controller may be aware of a model of a service, but the cloud controller can delegate the provisioning of instances of the service to another system. In such cases, even though the cloud controller is aware of a model of a service that is to be deployed, the cloud controller is unaware of the details associated with a service instance provisioned by the other system and what the model of such a deployed service instance should be. In such examples, information of a service instance provisioned or modified by the other system is made available to the cloud controller to allow the cloud controller to perform day-2 operations. The delegation can also be to perform day-2 management, such as scaling up or down a service instance, and so forth.

Figure 1:
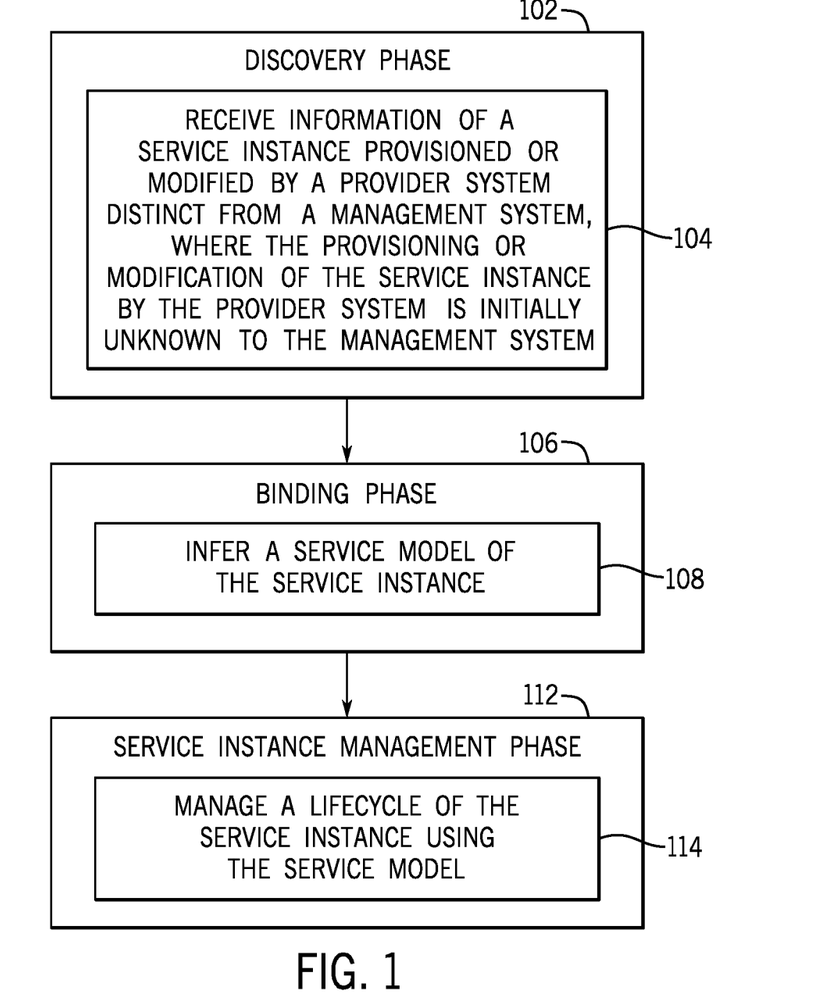
FIG. 1 is a flow diagram of a brown-to-manage process according to some examples.

FIG. 1 shows a process that performs a "brown-to-manage" process according to examples, where the brown-to-manage process performs operations to allow management of a service environment (including a service instance or multiple service instances) having a configuration that was unknown to a cloud controller, either because the service environment was pre-deployed, or was modified by another system or user, or was provisioned by another system or user.

As part of a discovery phase 102, the process of FIG. 1 receives (at 104) information of a service instance provisioned or modified by a provider system distinct from a management system (e.g., a cloud controller), where the provisioning or modification of the service instance by the provider system is initially unknown to the management system (e.g., the service instance was created by the provider system as part of a day-minus-1 operation, or the service instance provisioned by the management system was modified by the provider system, or the service instance was provisioned by the provider system as part of a delegation from the cloud controller). The source of the received information can be the provider system, or the source of the received information can be different from the management system and the provider system—examples of sources are discussed further below. The provisioning or modification of the service instance is initially unknown to the management system if the management system is not provided with information of the service instance provisioned by the provider system or modified by the provider system. The "provider system" can refer to a tool, a script, a program, or a person. The service instance whose provisioning or modification is unknown to the management system can be referred to as a "brown service instance" in the ensuing discussion.

As part of a binding phase 106, the process infers (at 108) a service model of the provisioned or modified service instance, where the service model represents a combination (e.g., a topology or workflow) of service components, where such service components can include resources used by the service instance or tasks of a workflow that is part of the model. The inferred service model can be different from an initial service model that the management system may be aware of. Inferring the service model can refer to using information describing service instances to determine a model of the service instance, such as based on relationships among the service components of the service instance that can be ascertained using the information.

The service model includes a representation (e.g., a graph-based representation) of an arrangement of service components of the service instance, where the representation can include elements (e.g., nodes of a graph) representing the service components, and further elements (e.g., links between nodes of the graph) indicating how the service components are related to one another. For example, a first service component can be related to a second service component if the operation of the first service component depends on or affects the operation of the second service component, the first service component is part of or includes the second service component, and so forth.

Inferring a service model can involve accessing information of various service components (and observed traffic or usage across them), and based on such information, determine how the service components are related to one another in the service model.

Although not shown in FIG. 1, the binding phase 106 in some examples can associate an action (and more specifically a lifecycle action), or a set of (lifecycle) actions, with the service model (discussed further below). In some examples, the binding phase can also associate a policy with the service model, where the policy relates to monitoring or managing the service instance. In other examples, the binding phase does not associate an action or a policy with the service model.

A policy can indicate any or some combination of the following: a service instance to monitor or manage, an entity to notify during the managing of the lifecycle of the service instance, a cloud zone in which the service instance is to be placed, and updating of the service instance. A cloud zone can refer to a geographic zone, a location in a data center rack, or any other location in a cloud system.

A policy (if associated with the service model) can guide day-1 and day-2 operations relating to a service instance (or service model). For example, at day 1, a policy can guide how to provision the service instance, such as a location of the service instance, a machine(s) (physical or virtual) in which the service instance is provided, etc.), what resources or other components to set up to enable monitoring of the service instance, and so forth. At day 2, a policy can specify components to monitor, actions to take to address detected or predicted problems, targets to notify, remediation actions to perform, and so forth.

As part of a service instance management phase 112, the management system (e.g., a cloud controller) manages (at 114) a lifecycle of the service instance using the service model and the action (and possibly the associated policy). Managing a lifecycle of a service instance can refer to performing any or some combination of the following: monitoring an operation of the service instance, managing the operation of the service instance, starting or stopping the service instance, upgrading the service instance (such as by applying a program patch), ensuring compliance with a service level agreement (SLA) or other policy in the use of the service instance, and other actions.

If an action is not associated with the service model during the binding phase 106, then the management of the service instance performs monitoring (e.g., for performances, usage, security, compliance) and/or tracking (by logging or otherwise maintaining information of tasks performed by the service instance) (where monitoring and tracking are default actions that can be performed by the cloud controller) of the service instance. However, if an action is associated with the service model during the binding phase 106, then the management can perform the associated action. This action can be applied with a policy (if associated during the binding phase 106).

The following provides further details regarding the various tasks of FIG. 1.

Discovery Phase

The discovery phase 102 performs automatic discovery of deployed or modified service instances. Examples of service instances can include instances of an Infrastructure as a Service (IaaS) environment, where IaaS instances can include computing resources, storage resources, network resources, an arrangement of components such as operating systems, applications, middleware components, and so forth. Other examples of service instances can include service instances of a Platform as a Service (PaaS) environment, where such service instances can include databases, web servers, application servers, virtual machines, and so forth. Further examples of service instances include service instances of a Software as a Service (SaaS) environment, where such service instances can include applications, operating systems, or other programs.

In further examples, service instances can be part of an application layer, which includes different application programs (e.g., email application programs, word processing application programs, spreadsheet application programs, etc.). Service instances can be part of a private datacenter (or private cloud), which can refer to an IT infrastructure provided by an organization for private use of the organization (i.e., the service instances of the private datacenter are generally not for consumption of users outside the organization). In further examples, service instances can be part of a public cloud or a hybrid cloud. A public cloud is provided by a cloud provider, and the service instances of the public cloud can be provided for consumption by consumers (or tenants) of the public cloud. A hybrid cloud can include service instances of a private datacenter and a public cloud.

In some examples, as part of the discovery phase 102, information of a brown service instance can be provided directly to the cloud controller (an example of the management system referred to in FIG. 1). For example, the cloud controller can query the provider system that created or modified the brown service instance can communicate directly with the cloud controller, such as using an application programming interface (API) or other interface of the provider system. The cloud controller can be configured with information of the API, for example, such that the cloud controller can submit a query to the provider system using the API (or more specifically, routines of the API). In some cases, the cloud controller can be provided with credentials of the provider system, where the credentials (e.g., password, identifier, key, etc.) can be used to access information maintained by the provider system.

The submitted query can be a query to a database or other information repository maintained by the provider system. In response to the query, information of various attributes of brown service instances can be provided to the cloud controller.

In other examples, other techniques of providing brown service instance information to the cloud controller can be performed. For example, the provider system can automatically send information of a brown service instance in response to the provider system provisioning the brown service instance or modifying the brown service instance.

In alternative examples, the discovery phase 102 can access other systems (other than the provider system that provisioned or modified the brown service instance) to obtain information about the brown service instance. For example, the discovery phase can query data from a configuration management database (CMDB) such as a CMDB provided by the uCMDB product from HPE. A CMDB contains information about configuration items (CIs), which represent various service instances in a given installation of service instances. The uCMDB product allows for automatic collection and management of service definitions, associated infrastructure relationships, and detailed information on service instances. In other examples, a CMDB can be managed by another type of tool.

An automated discovery system such as Universal Discovery (UD) can be used to automatically discover service instances and populate the uCMDB. UD crawls a network to find information of elements to populate the uCMDB. UD, or another system, can connect also to cloud controllers, PaaS or container management systems or orchestrators, to pull or subscribe to the provisioning information that can then be used to populate the uCMDB.

The automated discovery system gathers detailed CI information of attributes of service instances and relationships between the service instances and components of the service instances. For example, the automated discovery system can obtain Internet Protocol (IP) addresses, ports, and protocols used by service instances. The automated discovery system can monitor traffic in an environment that includes the service instances. Based on the monitoring, the automated discovery system is able to infer a topology of the service components of a service instance, and can generate a topology map that represents the topology of service components.

In other examples, the cloud controller can access information of other types of systems, such as a system used to decide what services or applications to transform of an existing enterprise into a cloud service. One such system is the Enterprise Maps product from HPE. The Enterprise Maps product (or more generally an enterprise architecture engine, such as an Open Group Architecture Framework or TOGAF engine or ArchiMate enterprise architecture engine) can identify which services or applications (including hardware resources and program resources) to provision and run as cloud services.

An "engine" can refer to a hardware processing circuit or a combination of a hardware processing circuit and machine-readable instructions (software and/or firmware) executable on the hardware processing circuit. The hardware processing circuit can include a microprocessor, a core of a multi-core microprocessor, a microcontroller, a programmable gate array, a programmable integrated circuit device, and so forth.

Enterprise Maps tracks the assets of an enterprise environment, including any or some combination of: program code, application programming interfaces (APIs), versions of program code and APIs, requirements documents, use cases, architecture documentation of components that are deployed and of existing components in an enterprise IT environment, and so forth. Enterprise Maps also allows surveys on these assets to guide what assets to move into a cloud. The tracking performed by Enterprise Maps produces information about service instances that are tracked and dependencies of service components of the service instances, lifecycle management APIs or other components for the service instances, and so forth. Enterprise Maps can be a good source to discover brown service instances or details to model these instances (possibly in combination with UD or UCMDB or other sources).

In further examples, the cloud controller can access information regarding service instances maintained by users, or information determined by analytics engines that perform analysis of service instances of an environment. The analysis performed by the analytics engines can include information indicating performance, errors, etc., of operation of service instances.

The discovery phase 102 can also perform a check of acquired information about brown service instances against other information. For example, the acquired information can be sent to a human user for verification that the acquired information of brown service instances is accurate. The response from the human user can include a confirmation, or other information that may modify the acquired information about the brown service instances. Alternatively, a human can inspect and modify with a tool the inferred model of the service instance. The check of the acquired information can also be performed with respect to other information. For example, information from a provider system can be checked against information acquired by a mapping engine (e.g., the Enterprise Maps product).

Binding Phase

The binding phase 106 logically combines service instances (for which information was acquired in the discovery phase 102) into a service model that can be used by the cloud controller.

Figure 2:
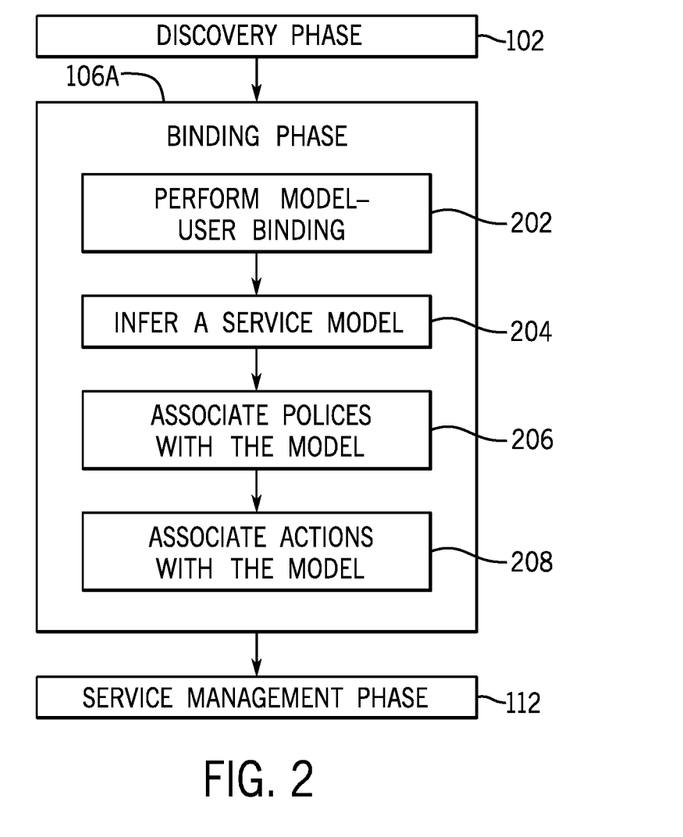
FIG. 2 is a flow diagram of a brown-to-manage phase process according to further examples.

FIG. 2 is a flow diagram of tasks of a brown-to-manage process according to further examples, where the brown-to-manage process includes the discovery phase, a binding phase 106A according to further implementations (where the tasks of the binding phase 106A depicted in FIG. 2 include tasks that are in addition to the tasks of the binding phase 106 shown in FIG. 1), and the service instance management phase 112.

The binding phase 106A includes performing model-user binding (at 202). The model-user binding can set different permissions for different users in accessing or managing service instances discovered by the discovery phase 102. Alternatively, the binding phase 106A can perform model-organization binding, to set permissions of organizations in accessing or managing service instances. The model-user binding or model-organization binding may be useful because a cloud controller like HPE CSA associates a service instance to a user or organization. This user or organization is potentially charged (monetarily) for the service instance, and is the user or organization that is allowed to manage and delete the service instance. In accordance with some implementations of the present disclosure, a similar goal is achieved for brown service instances to bind such brown service instances to users or organizations that are allowed to manage or delete the service instances.

The model-user binding can query a CMDB or other structured database or information repository to determine information pertaining to permissions of users in accessing or managing service instances. The queries can include Lightweight Direct Access Protocol (LDAP) queries to locate organizations, individuals, and other service instances in an environment. In other examples the queries can include relational database management queries submitted to relational databases. In further examples, user permissions can be inferred based on locations of service instances (e.g., a service instance located at a particular site may be accessed or managed by users at the particular site).

Alternatively or additionally, the model-user or model-organization binding can be based on manual association between the service model and organizations or users. The manual association can be based on an administrator or other user assigning roles, such as roles of authorized administrators or owners.

The binding phase 106A further infers (at 204) a service model of a service instance, similar to the process discussed further above.

The service model can be edited, such as by using the cloud controller (e.g., CSA tool from HPE). For example, the cloud controller can present a user interface that includes a representation of the service model. A user can use the user interface to change parts of the service model, such as to correct what was derived by the binding phase 106A.

In addition to performing the correction noted above, editing the service model can adapt a service instance from a first environment to a different second environment. For example, the inferred service model can represent the service model in a first type of public cloud. The service model can be edited to adapt use of the service model to another environment, such as a second type of public cloud, a private datacenter, or a virtual environment including virtual resources, or to indicate how and where to perform management tasks.

The service model can be based on the information acquired from a CMDB, a discovery engine (e.g., the Universal Discovery product from HPE, which can infer a service model), and so forth. In examples where a discovery engine such as the Universal Discovery product is used, the creation of the service model (at 108 or 204) can be based on a topology determined by the discovery engine.

The binding phase 106A further associates (at 206) policies with the topology. Information of policies can be obtained from a CMDB, such as the CMDB that was queried to discovery information of brown service instances. Alternatively, policies can be obtained from other sources. The policies can include a policy governing monitoring of service instances, a policy governing utilization of service instances, a policy governing management of service instances, and so forth.

The binding phase 106A can also associate (at 208) actions (and more specifically, lifecycle actions) with the service model. Associating an action with the service model includes associating the action with an element (e.g., a node) or a group of elements (e.g., a group of nodes) of the service model.

The actions can include actions relating to starting a service instance, moving a service instance, terminating a service instance, scaling operation of a service instance (e.g., increase or decrease a speed or size of the service instance), monitoring a service instance, managing a service instance, and so forth. The actions that are associated with the service model can include information describing how each action is to be performed. For example, the information regarding an action can specify an API or other routine to use for performing the action (e.g., use a specific routine of an API to terminate a service instance). As another example, a virtual machine system such as vSphere or a container management system (e.g., Cloud Foundry, Kubernetes, etc.) can be called by the API (e.g., used to implement the API). More generally, the associated action can include information specifying an implementation mechanism to implement the action.

The associated actions can be part of lifecycle actions that are performed by the cloud controller in managing service instances (which include brown service instances and service instances deployed by the cloud controller).

Note that policies and/or actions associated with the service model can be associated with individual service components of a service instance, such as a database server, an application server, a program, and so forth. Alternatively, the policies and/or actions can be associated with the service instances. Generally, associating a policy or action with a service instance can refer to associating a policy or action individually with a service component of the service instance or associating a policy or action with a service instance.

Also, associating policies and/or actions can refer to including information about the policies and/or actions in the service model, e.g., as part of node information about nodes representing service instances. Alternatively, information of the polices and/or actions can be included in metadata that can be included as part of the service model or can be otherwise associated with the service model.

Service Management Phase

The service instance management phase 112 includes using policies and/or actions (including those associated at 206 and 208) as well as the service model (derived at 204) to perform lifecycle management of service instances. The lifecycle management can be performed by a cloud controller.

Example Arrangement

Figure 3:
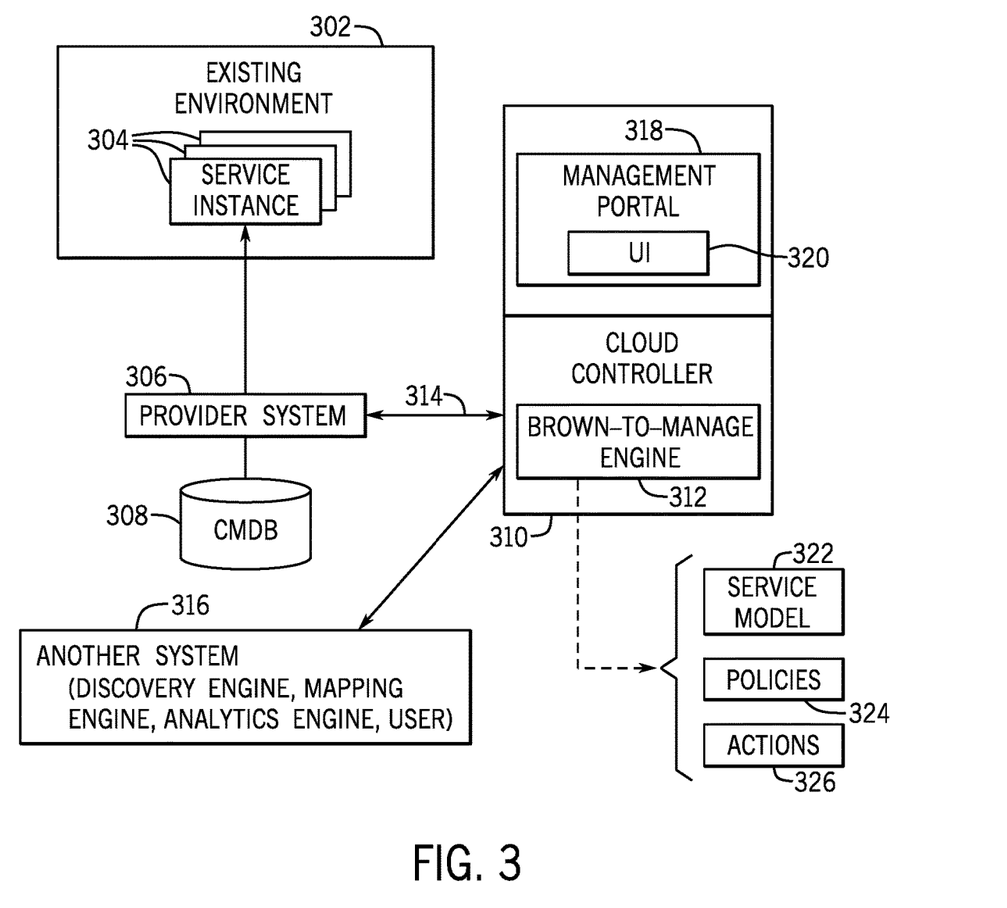
FIG. 3 is a block diagram of an arrangement that includes an existing environment and a cloud controller according to some examples.

FIG. 3 is a block diagram of an example arrangement that includes an existing environment 302 including brown service instances 304 provided (provisioned and/or modified) by a provider system 306. The provider system 306 can store information about the service instances 304 in a CMDB 308 (or other information repository).

The provider system 306 that provisioned or modified the service instances 304 is selected from among a cloud controller (different from the cloud controller 310 shown in FIG. 3), a PaaS service (a service that is part of a PaaS cloud, such as Cloud Foundry or OpenStack), a container controller (e.g., a Kubernetes system, a Mesos system, etc.), a program, a tool, or a client device that is responsive to a user input.

A cloud controller 310 includes a brown-to-manage engine 312 that is able to perform the brown-to-manage process as discussed above. Although the brown-to-manage engine 312 is depicted as being part of the cloud controller 310 FIG. 3, it is noted that in other examples, the brown-to-manage engine 312 can be part of a system separate from the cloud controller 310.

To perform the discovery phase 102, the brown-to-manage engine 312 can acquire information of brown service instances using any of various techniques, including submitting queries (314) to the provider system 306, which can respond to the queries with information of the brown service instances 304 retrieved from the CMDB 308.

Alternatively, the brown-to-manage engine 312 can acquire the information of the brown service instances 304 from another system 316, such as a discovery engine, an enterprise engine, an analytics engine, a user, and so forth (and the provider system 306 or CMDB 308).

In the binding phase 106 or 106A, the brown-to-manage engine 312 can derive a service model 322 representing a service instance (including any of the brown service instances 304 and service instances created and instantiated by the cloud controller 310), policies 324 associated with the service model 322, and actions 326 associated with the service model 322.

The cloud controller 310 can include a management portal 318, which is the engine by which users can interact with the cloud controller 310. The management portal 318 can present a user interface (UI) 320, which is accessible by users (from client devices over a network, for example), to view the cloud service(s) and resource(s) of the cloud service(s).

A user can log into the management portal 318 of the cloud controller 310 to access or manage service instances (including the brown service instances 304 and service instances created and instantiated by the cloud controller 310). For example, using the management portal 318, users can perform operations such as starting, stopping, or restarting a service instance, flexing in or flexing out service instances into or out of a private or public cloud (which means that the users can select when a service instances is part of a cloud and when the service instances is removed from the cloud), and so forth.

Also, using the UI 320, a service model (e.g., the service model 322) can be edited by a user.

Note also that an external system (another controller, a PaaS system, etc.) can be used to implement lifecycle management actions, such as by calling vSphere, Cloud Foundry, Kubernetes, etc., to perform the actions on brown service instances.

Example Use

The following describes an example of a brown-to-manage process that involves brown service instances that use virtual resources (e.g., virtual machines or virtual servers) that are created by a virtual machine system. The virtual machines are deployed by the virtual machine system (e.g., the vCenter product from VMware), but can be managed by a cloud controller (e.g., CSA Marketplace Portal product from HPE).

In the discovery phase 102, details of virtual resources for use by brown service instances are collected from the virtual machine system. In some examples, the virtual machine system can be configured as a provider for the cloud controller, which means that the virtual machine system is a provider of virtual resources to the cloud controller. For example, a resource synchronization operation can be performed for the providers of the cloud controller, which causes information of resources from various provider systems to be sent to the cloud controller.

Note that the virtual machine system (or any other provider system of a brown service instance) can be bound to the cloud controller as a provider at runtime of the cloud controller. This binding causes brown service instances of the provider system to be bound to the cloud controller, using information of attributes of the brown service instances acquired in the discovery phase 102.

In further examples, a user can cause an input file, such as an eXtensible Markup Language (XML) file, to be imported into the CSA. The virtual resources specified in the input file can be validated by the cloud controller against pre-collected data from virtual machine system that is configured as a provider of the cloud controller.

After the virtual resources have been validated, the binding phase 106 performed by the cloud controller can create a service model based on the relationship among virtual resources provided in the input file. In addition, the binding phase 106 can associate policies and actions to the service model, as discussed further above.

When large numbers of virtual resource are to be imported into the cloud controller, a bulk import option can be used. An administrator can collect data output of various virtual resources from the virtual machine system, and can obtain an inventory of virtual resources that are available to import. The administrator can then filter the virtual resources that belong to specific user(s) (the filtering can remove virtual resources that do not belong to the specific user(s)), and create an input file that that includes a subset of the virtual resources to import on behalf of the specific user(s).

When the administrator initiates a bulk import request, an import tool can programmatically submit multiple sub-requests to import virtual resources on behalf of each user as defined in the input file. Once the bulk import request is complete, the cloud controller can notify individual users about the virtual resources imported on their behalf, and the cloud controller can now manage the virtual resources.

Although reference is made in to virtual resources in the foregoing example, it is noted that similar techniques can be applied more generally to service instances, including IaaS instances, PaaS instances, SaaS instances, and so forth.

In addition to user provided input, techniques or systems according to some examples can also leverage any structured data that may exist for service instances, such as in a CMDB or other source. The data provided can be used to logically associate service instances to policies, users, and actions.

Figure 4:
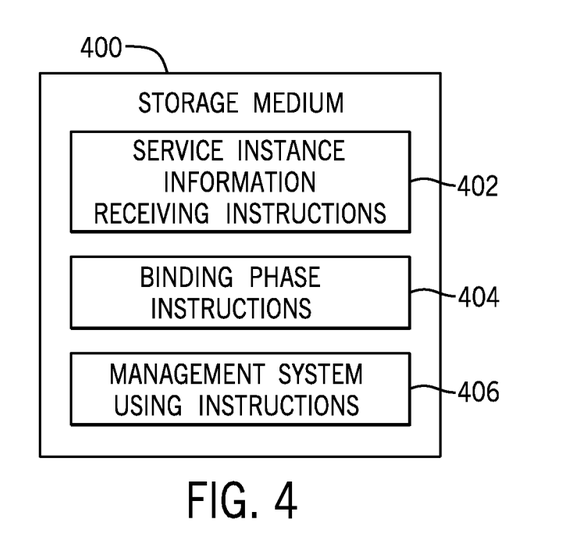
FIG. 4 is a block diagram of a storage medium storing machine-readable instructions according to some examples.

FIG. 4 is a block diagram of a non-transitory machine-readable or computer-readable storage medium 400 storing machine-readable instructions that are executable by a system to perform various tasks. The machine-readable instructions include service instance information receiving instructions 402 to receive information of a first service instance provisioned or modified by a provider system distinct from a management system, wherein the provisioning or modification of the service instance by the provider system is initially unknown to the management system.

The machine-readable instructions include binding phase instructions 404 to, as part of a binding phase, determine a model representing service components of the service instance, and associate a lifecycle action with an element or a group of elements the model.

The machine-readable instructions further include management system using instructions 406 to use the management system to manage a lifecycle of the service instance using the model and the lifecycle action.

Figure 5:
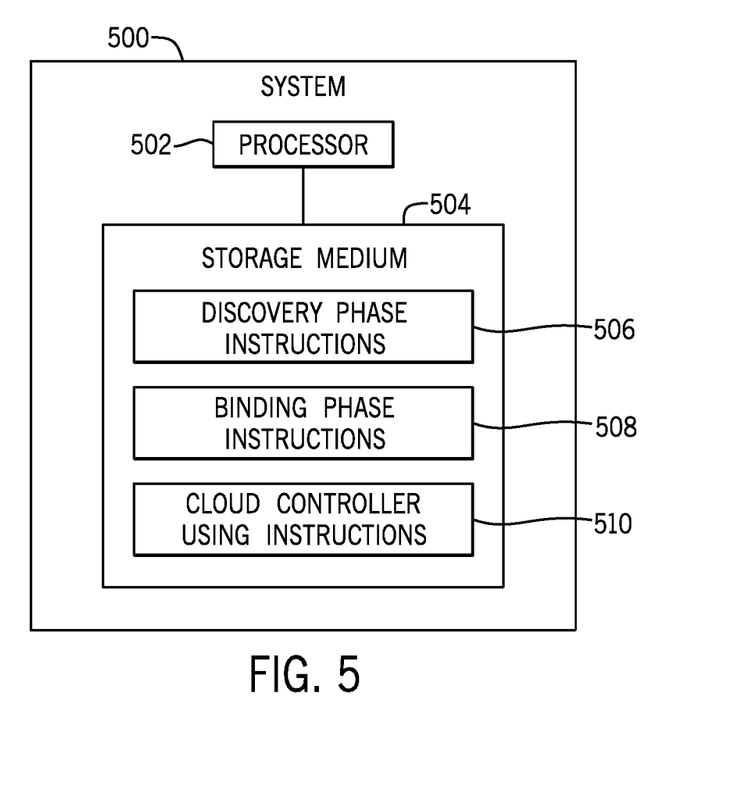
FIG. 5 is a block diagram of a system according to some examples.

FIG. 5 is a block diagram of a system 500 that includes a processor 502 (or multiple processors) and a storage medium 504 that stores machine-readable instructions executable on the processor 502 to perform specified tasks. A processor can include a microprocessor, a core of a multi-core microprocessor, a microcontroller, a programmable integrated circuit, a programmable gate array, or another hardware processing circuit.

Machine-readable instructions executable on a processor can refer to the instructions executing on a single processor or on multiple processors.

The machine-readable instructions include discovery phase instructions 506 to, as part of a discovery phase, receive information of a service instance provisioned or modified by a first system distinct from a cloud controller, wherein the provisioning or modification of the service instance by the first system is initially unknown to the management system. The machine-readable instructions further include binding phase instructions 508 to, as part of a binding phase, determine a model of the service instance, associate a policy with an element or group of elements of the model, and associate a lifecycle action with an element or a group of elements the model.

The machine-readable instructions further include cloud controller using instructions 510 to use the cloud controller to manage a lifecycle of the service instance using the model, the policy, and the lifecycle action.

The storage medium 400 or 500 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method executed by at least one processor, comprising:
    as part of a discovery phase, receiving information of a service instance provisioned or modified by a first system distinct from a management system, wherein the provisioning or modification of the service instance by the first system is initially unknown to the management system;
    as part of a binding phase, inferring a model representing the service instance provisioned or modified by the first system, wherein the model comprises nodes representing service components of the service instance, and links between the nodes representing relationships between the service components, and wherein inferring the model comprises accessing information of the service components of the service instance and determining how the service components are related to one another, and
    managing, by the management system, a lifecycle of the service instance using the model.

2. The method of claim 1, further comprising, as part of the binding phase, associating an action with a node of the model, wherein managing the lifecycle of the service instance further uses the action.

3. The method of claim 2, wherein associating the action with the model comprises associating an application programming interface (API) that is useable by the management system to perform the action as part of the managing of the lifecycle of the service instance.

4. The method of claim 2, wherein the action is a lifecycle action selected from among starting a service instance, moving a service instance, terminating a service instance, scaling operation of a service instance, monitoring a service instance, or managing a service instance.

5. The method of claim 1, wherein the managing comprises one or both of monitoring the service instance and tracking the service instance.

6. The method of claim 1, wherein receiving the information of the service instance as part of the discovery phase comprises obtaining, by the management system, the information of the service instance from a discovery engine that gathers information of attributes of service instances and relationships between the service instances and components of the service instances.

7. The method of claim 1, wherein receiving the information of the service instance as part of the discovery phase comprises obtaining the information of the service instance from an engine that tracks assets of an environment and produces information about service instances that are tracked and dependencies of service components of the service instances.

8. The method of claim 1, wherein receiving the information of the service instance as part of the discovery phase comprises obtaining the information of the service instance from an analytics system that performs analysis of service instances in an environment.

9. The method of claim 1, wherein receiving the information of the service instance as part of the discovery phase comprises querying data from a configuration management database (CMDB).

10. The method of claim 1, further comprising, as part of the binding phase, associating a policy with the model, the policy indicating any one or a combination of the service instance to monitor or manage, an entity to notify during the managing of the lifecycle of the service instance, a cloud zone in which the service instance is to be placed, or updating of the service instance.

11. The method of claim 1, wherein the binding phase further comprises associating a user or organization with the service instance, and wherein associating the user or the organization with the service instance comprises associating a permission for the user or the organization to access or manage the service instance.

12. The method of claim 1, further comprising:
    receiving a user edit of the inferred model to perform one of:
        adapt the model for a first environment to deploy the service instance in a different second environment, or
        correct the model.

13. The method of claim 1, wherein the management system is a cloud controller to manage a cloud, and wherein the provisioning of the service instance by the first system is responsive to delegation, by the cloud controller, of the provisioning or day-2 management to the first system.

14. The method of claim 1, wherein the first system that provisioned or modified the service instance is selected from among a cloud controller, a PaaS module, a container controller, a program, a tool, or a device responsive to user input.

15. A non-transitory machine-readable storage medium storing instructions that upon execution cause a system to:
- receive information of a service instance provisioned or modified by a provider system distinct from a management system, wherein the provisioning or modification of the service instance by the provider system is initially unknown to the management system;
- as part of a binding phase,
  - create a model representing service components of the service instance provisioned or modified by the provider system, wherein the model comprises nodes representing the service components of the service instance, and links between the nodes representing relationships between the service components, and wherein creating the model comprises accessing information of the service components of the service instance and determining how the service components are related to one another, and
  - associate a lifecycle action with an element or a group of elements of the model; and
- use the management system to manage a lifecycle of the service instance using the model and the lifecycle action.

16. The non-transitory machine-readable storage medium of claim 15, wherein the instructions upon execution cause the system to associate a policy with the model, the policy relating to monitoring or managing the service instance.

17. A system comprising:
- a processor; and
- a non-transitory storage medium storing instructions executable on the processor to:
  - as part of a discovery phase, receive information of a service instance provisioned or modified by a first system distinct from a cloud controller, wherein the provisioning or modification of the service instance by the first system is initially unknown to the management system;
  - as part of a binding phase,
    - infer a model of the service instance provisioned or modified by the first system, wherein the model comprises nodes representing service components of the service instance, and links between the nodes representing relationships between the service components, and wherein inferring the model comprises accessing information of the service components of the service instance and determining how the service components are related to one another,
    - associate a policy with an element or group of elements of the model, and
    - associate a lifecycle action with an element or a group of elements of the model; and
  - use the cloud controller to manage a lifecycle of the service instance using the model, the policy, and the lifecycle action.

18. The system of claim 17, wherein the model that is inferred is different from an initial model that the cloud controller is aware of, the initial model not reflecting the service instance as provisioned or modified by the first system distinct from the cloud controller.

19. The method of claim 1, wherein the information of the service components accessed to infer the model comprises observed traffic between the service components.

20. The method of claim 1, wherein the model that is inferred is different from an initial model that the management system is aware of, the initial model not reflecting the service instance as provisioned or modified by the first system distinct from the management system.

21. The non-transitory machine-readable storage medium of claim 15, wherein the model that is created is different from an initial model that the management system is aware of, the initial model not reflecting the service instance as provisioned or modified by the provider system distinct from the management system.

* * * * *